April 16, 1968 D. J. TERNES ET AL 3,378,297
SAFETY VISOR HINGE
Filed May 27, 1966
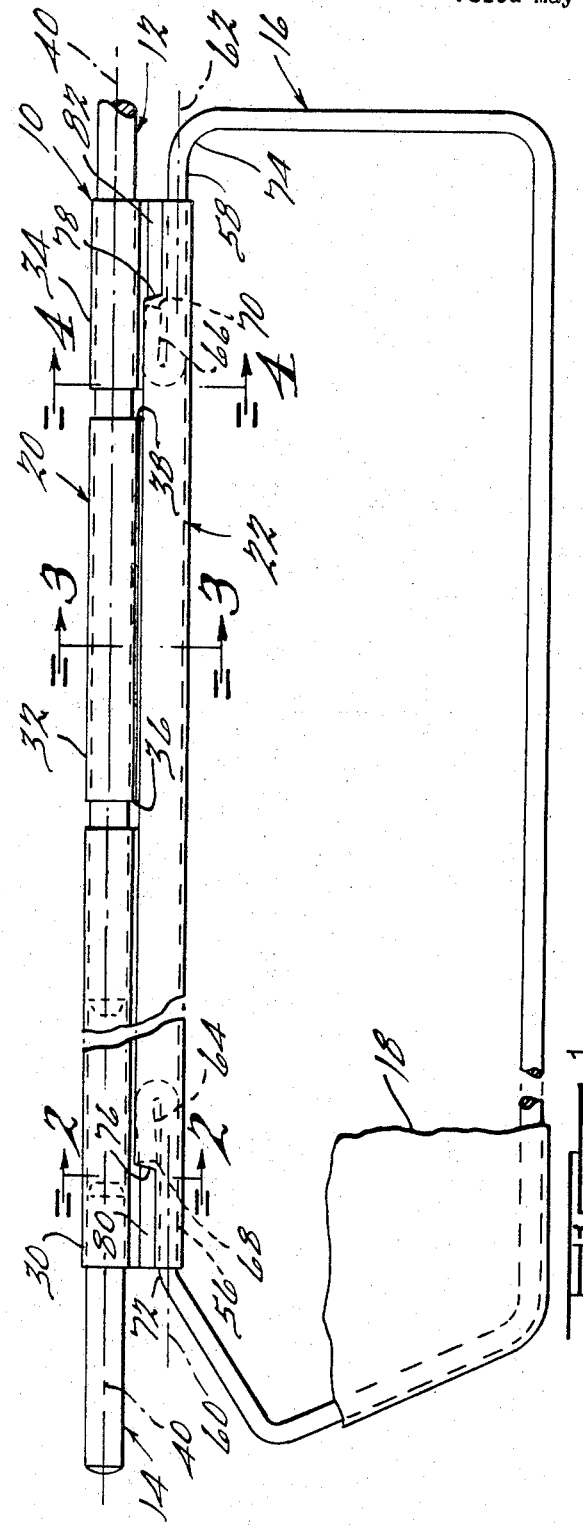
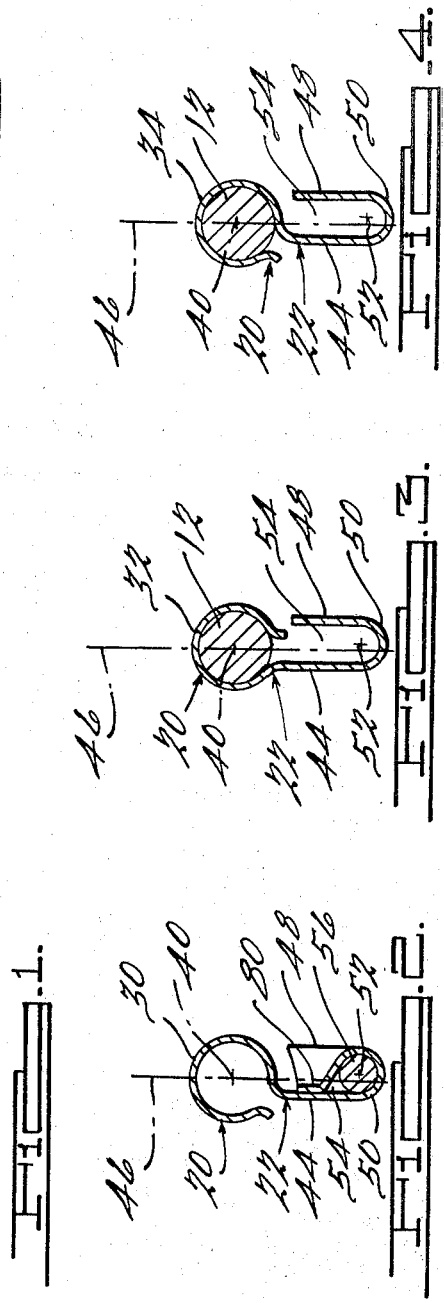
INVENTORS
Donald J. Ternes
Ralph E. Ford
BY
*Karnes, Dickey & Pierce*
ATTORNEYS.

3,378,297
SAFETY VISOR HINGE
Donald J. Ternes, Grosse Pointe Woods, and Ralph E. Ford, Harper Woods, Mich., assignors to Ternes Steel Company, Roseville, Mich., a corporation of Michigan
Filed May 27, 1966, Ser. No. 553,428
9 Claims. (Cl. 296—97)

ABSTRACT OF THE DISCLOSURE

A visor hinge assembly for automobiles has a hinge member with reversely bent opposite-side portions, one of which receives the hinge rod and the other of which receives and is crimped to form stops for the reversely bent end portions of a wire loop that serves as a frame for the visor material.

---

This invention relates to a visor assembly; and, more particularly, to a windshield visor hinge and wire frame assembly for vehicular use.

A visor hinge of the type to which this invention relates is disclosed in U.S. 3,188,685, the disclosure of which is hereby incorporated herein by reference. In the prior art, it has been the practice to attach a wire frame, for supporting the visor material, to the visor hinge by welding end portions of the wire frame to the visor hinge. This practice has resulted in formation of a "raw" edge which may be sharp, jagged, and irregular. A purpose of the present invention is to eliminate the "raw" edge for safety purposes.

Furthermore, the prior art method of welding end portions of a wire frame to a sheet metal hinge has been difficult to practice and has required rather expensive equipment and fixtures. Another purpose of this invention is to provide new and improved means for and methods of attaching the end portions of a wire frame to a sheet metal hinge.

An illustrative embodiment of the invention principles is hereinafter disclosed by reference to the accompanying drawing in which;

FIGURE 1 is a plan view of a visor hinge and frame assembly;

FIGURE 2 is a sectional view taken along line 2—2 in FIGURE 1;

FIGURE 3 is a sectional view taken along line 3—3 in FIGURE 1; and

FIGURE 4 is a sectional view taken along line 4—4 in FIGURE 1.

Referring now to the drawing, the visor assembly comprises hinge means 10 adapted to be rotatively mounted on a rod means 12, which may include a support rod extension 14, and wire frame means 16 on which visor material 18 is mounted.

Hinge means 10 is formed from a single sheet of metal material and comprises a hinge section 20 and a base section 22. The hinge section is divided into a series of slotted sections which are formed into circumferentially extending tubular portions 30, 32, 34. Tubular portions 30 and 34, FIGS. 2 and 4, extend approximately 360° in one direction and tubular portion 32, FIG. 3, extends approximately 360° in the opposite direction. Parallel slots 36, 38 divide the sheet of material into slotted sections and separate the tubular portions. The tubular portions are substantially coaxially formed about a common central longitudinal axis 40.

The base section 22 includes a connecting portion 44 which integrally connects the tubular portions along one edge and extends away from the tubular portions in a plane extending parallel to and laterally spaced from a central plane 46 including the common longitudinal axis 40 of the tubular portions. An end portion 48 of the base section 22 is reversely bent relative to the connecting portion and extends toward the tubular portions in a plane parallel to the connecting portion and the central plane 46 and located on the other side of the central plane from the connecting portion 44. A curved portion 50 integrally connects the end portion 48 and the connecting portion 44. The center of curvature 52 of the curved portion 50 lies in or is spaced closely adjacent the central plane so that the central longitudinal axis 40 of the tubular portions and the center of curvature 52 lie in a plane which is substantially parallel to the connecting portion 44 and the end portion 48. A slot means 54 is formed between the connecting portion and the end portion and defines a socket and sheath for a purpose to be hereinafter described in detail.

The wire frame is made from a length of wire which has a contour corresponding to the visor. Opposite end portions 56, 58 extend toward one another and have substantially coaxial central axes 60, 62. Terminal portions 64, 66 of the end portions are reversely bent and extend away from one another in opposite directions in closely spaced parallel relationship with the end portions 56, 58. Abutment means are provided by oppositely facing transverse abutment surfaces 68, 70 formed by the ends of the wire which terminate a substantial distance from the bends 72, 74 connecting the contoured portion of the frame to the end portions.

The diameter of the wire is approximately equal to the diameter of the curved portion 50 of the base section and to the distance between the connecting portion 44 and the end portion 48 of the base section. The distance in the slot 54 from the curved portion 50 to the tubular portions 30, 32, 34 is approximately equal to twice the diameter of the wire so that width of the overlapping end portions 56, 58 and terminal portions 64, 66 of the wire frame is approximately equal to the width of the slot between the curved end portion 50 and the tubular portions 30, 32, 34. The overlapping end portions and terminal portions are slidably received in opposite ends of the slot and are non-rotatably fixedly supported therein for rotation with the hinge means. The terminal portions are spaced inwardly beyond the ends of the slot and stop means 76, 78 are integrally formed in the base section and engage the transverse abutment surfaces to prevent withdrawal of the end portions of the wire frame. In the illustrative embodiment, the stop means is formed by inwardly crimping portions 80, 82 of the reversely bent end portion 48 around the end portions of the wire frame. Thus, the ends of the wire frame are securely fixed relative to the hinge means without a welding operation and the connecting portion 44 and the end portion 48 and the curved portion 50 of the base section 22 form a protective covering sheath means for the ends of the wire frame.

It is contemplated that certain features of this invention may be variously otherwise embodied and it is intended that the scope of the following claims be construed to cover alternative embodiments except insofar as limited by the prior art.

What is claimed is:

1. In a vehicle visor assembly hinge means 10 adapted to be mounted for rotative movement;
   wire frame means 16 attached to said hinge means for rotative movement therewith and comprising:
   spaced end portions of said wire frame means extending in general coaxial relationship toward one another,
   abutment means provided on said end portions,
   slot means formed in said hinge means and receiving said end portions, and
   stop means associated with said slot means and engaging said abutment means to prevent withdrawal of said end portions from said slot means.

2. The invention as defined in claim 1 and wherein said wire frame means being attached to said hinge means only by engagement of said stop means and said abutment means without welding.

3. The invention as defined in claim 1 and having protective sheath means attached to said hinge means and forming said slot means and protectively covering said end portions of said wire frame means.

4. The invention as defined in claim 3 and wherein said protective sheath means being integrally formed in said hinge means.

5. The invention as defined in claim 1 and said stop means being integrally formed in said hinge means by crimping portions of said hinge means into restraining engagement with said end portions.

6. In a vehicle visor assembly, the combination of a hinge means 10 and visor frame means 16 attached to said hinge means for supporting visor means and wherein:

said hinge means 10 being formed from a single sheet of material, said sheet of material being provided with a series of parallel slots 36, 38, 40 extending inwardly from one edge of said sheet of material and dividing said sheet of material into a plurality of tubular portions 30, 32, 34 integrally connected by a common base section 22, alternate tubular portions extending outwardly in opposite directions from the plane of said base section and relative to one another, each tubular portion having a generally cylindrical tubular form and extending outwardly from one side of said base section and circumferentially around to the other side of said base section and terminating adjacent thereto;

each tubular portion being substantially coaxially aligned along a common longitudinal axis 40, said common base section having a connecting portion 44 connected along one edge to said tubular portions and extending away from said tubular portions in a plane extending generally parallel to and laterally spaced from a plane 46 including said common longitudinal axis 40, said common base section having an end portion 48 reversely bent relative to said connecting portion and extending toward said tubular portions in a plane laterally spaced from said connecting portion on the other side of a plane 46 including said common longitudinal axis 40, a curved portion 50 integrally connecting said end portion and said connecting portion and having a center of curvature 52 lying in a plane including said common longitudinal axis 40 and said plane being substantially parallel to said common base section and said end portion, slot means 54 formed between said common base section and said end portion and defining a socket adapted to receive, at opposite ends of said common base section, the ends 56, 58 of wire frame means 16;

said wire frame means being formed by a contoured wire having opposite end portions 56, 58 extending toward one another and having substantially coaxial central axes 60, 62, terminal portions 64, 66 of said end portions being reversely bent and extending away from one another in opposite directions, said terminal portions and said end portions extending substantially parallel to one another in closely spaced overlapping relationship, oppositely facing transverse abutment means 68, 70 formed on said end portions, the width of said wire being such that the width of said overlapping end portions and terminal portions is approximately equal to the width of said slot means from said curved portion to said tubular portions, the overlapping end portions and terminal portions being slidably received in opposite ends of said slot means and fixedly supported by said common base section for rotative movement with said hinge means, the abutment means on said terminal portions being spaced inwardly beyond the ends of said slot means, and portions 80, 82 of said common base section between the abutment means on said wire and the end of said slot means being bent inwardly toward said end portions of said wire to provide stop means 76, 78 engaging said transverse abutment means and preventing withdrawal of said terminal portions and said end portions of said wire from said slot means, the curved portion and the connecting portion and the end portion of said common base section forming a protective covering sheath for the end portions and terminal portions of said wire.

7. A vehicle visor assembly as set forth in claim 1 wherein said hinge means comprises an elongated sheet metal member having a base section and a hinge section, said hinge section being a reversely turned portion of the member extending along one side of the base section, said member having a reversely turned portion extending along the other side of the base section to provide said slot means.

8. A vehicle visor assembly as set forth in claim 7 wherein said wire frame means has reversely bent end portions and the ends of the wire in said reversely bent end portions provide said abutment means.

9. A vehicle visor assembly as set forth in claim 8 wherein said reversely turned portion providing said slot means has inwardly deformed portions engageable with said ends of the wire and providing said stop means.

References Cited

UNITED STATES PATENTS

| | | | |
|---|---|---|---|
| 2,072,648 | 3/1937 | Randall | 296—97 |
| 2,844,200 | 7/1958 | Herr et al. | 296—97 |
| 3,193,323 | 7/1965 | Herr et al. | 296—97 |
| 3,282,624 | 11/1966 | Doerfing | 296—97 |

FOREIGN PATENTS

| | | |
|---|---|---|
| 1,069,014 | 11/1959 | Germany. |
| 1,111,968 | 7/1961 | Germany. |

BENJAMIN HERSH, *Primary Examiner.*

L. D. MORRIS, *Assistant Examiner.*